US012579271B2

(12) United States Patent
Han et al.

(10) Patent No.: US 12,579,271 B2
(45) Date of Patent: Mar. 17, 2026

(54) CROSS-ARCHITECTURE AUTOMATIC DETECTION METHOD AND SYSTEM FOR THIRD-PARTY COMPONENTS AND SECURITY RISKS RELATED TO FIRMWARE IN INTERNET OF THINGS DEVICES THEREOF

(71) Applicant: HANGZHOU EVERGREEN INFORMATION TECHNOLOGY CO., LTD., Hangzhou (CN)

(72) Inventors: Meng Han, Hangzhou (CN); Changting Lin, Hangzhou (CN); Peng Duan, Hangzhou (CN); Melody Xiaoyun Shan, Hangzhou (CN); Lei Zhang, Hangzhou (CN); Qiang Gong, Hangzhou (CN); Binbin Zhao, Hangzhou (CN); Haitao Xu, Hangzhou (CN); Jiacheng Xu, Hangzhou (CN); Bin Wang, Hangzhou (CN); Weiping Yu, Hangzhou (CN)

(73) Assignee: HANGZHOU EVERGREEN INFORMATION TECHNOLOGY CO., LTD., Hangzhou (CN)

( * ) Notice: Subject to any disclaimer, the term of this patent is extended or adjusted under 35 U.S.C. 154(b) by 504 days.

(21) Appl. No.: 17/991,691

(22) Filed: Nov. 21, 2022

(65) Prior Publication Data

US 2023/0161880 A1 May 25, 2023

(30) Foreign Application Priority Data

Nov. 24, 2021 (CN) .......................... 202111403690.1

(51) Int. Cl.
*G06F 21/57* (2013.01)

(52) U.S. Cl.
CPC .......... *G06F 21/572* (2013.01); *G06F 21/577* (2013.01); *G06F 2221/033* (2013.01)

(58) Field of Classification Search
CPC ................ G06F 21/572; G06F 21/577; G06F 2221/033; G06F 21/562; G06F 21/563; G06F 21/57; G06N 3/044; G06N 3/08

(Continued)

(56) References Cited

U.S. PATENT DOCUMENTS 10,656,940 B1 * 5/2020 Hogan ...................... G06F 8/41
11,042,637 B1 * 6/2021 Davis .................... G06F 21/121

FOREIGN PATENT DOCUMENTS

CN       113515457       10/2021
WO       WO-2020026228 A1 * 2/2020 .......... G06F 11/0793

* cited by examiner

*Primary Examiner* — Bryan F Wright
(74) *Attorney, Agent, or Firm* — Jiwen Chen; Joywin IP Law PLLC

(57) ABSTRACT

The invention discloses a cross-architecture automated detection method and system for third-party components and security risks, comprising: identify and reverse the firmware of the IoT device, classify the resulting reverse products into binary and non-binary files; disassemble binary files to mine the semantic information in them; convert non-binary files into string text files; build a database containing third-party components and their known CVE; combine pattern matching to scan string text files automatically, collect third-party components in the firmware of IoT device, and collect and retrieve vulnerabilities of corresponding third-party components. Through organically combining the semantic information of the vulnerability assembly code and the semantic information of the firmware assembly code of IoT device, the similarity comparison across architectures and deep learning is realized, and the specific pattern vulnerability is mined and verified automatically. The invention does not (Continued)

require the acquisition of firmware source code, the detection process is automated, greatly reducing the difficulty and workload of manual analysis.

6 Claims, 2 Drawing Sheets

(58)  Field of Classification Search
 USPC ............................................................ 726/3
 See application file for complete search history.

CROSS-ARCHITECTURE AUTOMATIC DETECTION METHOD AND SYSTEM FOR THIRD-PARTY COMPONENTS AND SECURITY RISKS RELATED TO FIRMWARE IN INTERNET OF THINGS DEVICES THEREOF

This application claims priority of Chinese Application No. 2021114036901, filed Nov. 24, 2021, all of which is hereby incorporated by reference.

TECHNICAL FIELD

The present invention relates to the field of Internet of Things (IoT) protocol testing technology, in particular to a cross-architecture automated detection method and system for third-party components and security risks thereof.

BACKGROUND TECHNOLOGY

At present, the number of IoT devices is growing rapidly. Gartner predicts that the number of IoT devices used worldwide will grow to 20.8 billion by 2020. Firmware is a special type of software that provides the underlying control of device hardware to a large number of IoT. From this point of view, the security of IoT devices depends to a large extent on the security of their firmware.

The firmware of IoT device is a type of software embedded in IoT hardware devices that performs functions similar to "operating system" in IoT devices. This means that once the firmware vulnerability of IoT device is exploited, an attacker can often take control of the entire IoT device. Hackers proactively exploit IoT security vulnerabilities not to attack the device itself, but as a springboard for a variety of malicious behaviors, paving the way for subsequent distributed denial-of-service attacks, malware distribution, spam email delivery, click fraud, credit card theft, and more.

There are two main types of firmware security vulnerabilities in IoT devices: one type is the firmware security vulnerabilities themselves, mainly including code defects and program errors in the development process; Insecure configuration information; Sensitive information and key information disclosure. The other type is integrated third-party software vulnerabilities, which mainly include the use of third-party software that is not maintained and third-party software with lagging versions, which lack security attention and vulnerability review, and there are security risks.

The Chinese patent literature with the publication number CN113515457A discloses a method for detecting the firmware security of IoT device, comprising: obtaining the firmware information of IoT device to be detected, the firmware information comprises the firmware ID, version number; finding the corresponding boot files, web components, and vulnerability information according to the firmware information. The simulation module simulates the web page according to the found startup file and web components, and obtains the web page to be detected. According to the found vulnerability information, the vulnerability verification module simulates the attack on the web page to be detected obtained by the simulation module according to the vulnerability number and exp code in the vulnerability information. The result information after the simulated attack is obtained, the existence of the vulnerability in the result information is verified, and if it is determined that there is a vulnerability, the firmware information, vulnerability information and result information are displayed.

At present, there are still closed source, customization and massive significant features of the firmware of IoT device, and there is a lack of a unified platform or tool that can be directly applied to the security analysis of the firmware of IoT device of different manufacturers and different devices. Firmware lacks an open and unified standard, it is inseparable from the features of its direct embedding in hardware, and different manufacturers of hardware structure is highly customized, even the firmware of different devices from the same manufacturer often varies greatly. For commercial and security reasons, manufacturers also tend not to disclose the structure and code of their respective firmware. This makes top-down code analysis techniques difficult to apply. Dynamic analysis methods are subject to the huge cost of physical equipment, and reverse analysis has become a common method of firmware analysis. In addition, different devices may adopt different hardware architectures, resulting in multiple firmware architectures, which brings great challenges to manually reverse firmware analysis. How to implement a common cross-architecture firmware security analysis is one of the key directions of research.

SUMMARY OF THE INVENTION

In view of the technical deficiencies of cross-architecture automated firmware security analysis of IoT device, the present invention provides a cross-architecture automated detection method and system for third-party components and their security risks, the method and system adopt reverse dismantling and analysis of firmware, without the need to obtain firmware source code. The inspection process is automated, which greatly reduces the difficulty and workload of manual analysis. By augmenting the similarity model training dataset, it can be easily extended to multiple schemas and is already applicable to many of the current mainstream architectures.

The technical implementations of the present invention are as follows:

A cross-architecture automated detection method for third-party components and their security risks, including the following steps:

(1) Identifying and reversing the firmware of IoT device, and classify the generated reverse products into binary and non-binary files; Disassemble binaries to mine the semantic information in them; Convert non-binary files into string text files;

(2) Establishing a database containing third-party components and their known CVE; Combined with pattern matching, it automatically scans and collects third-party components in the firmware of IoT device, collects and retrieves the vulnerabilities of corresponding third-party components;

(3) By organically combining the semantic information of the vulnerability assembly code and the semantic information of the firmware assembly code of IoT device, the similarity comparison across architectures and deep learning is realized, and the specific pattern vulnerabilities are automatically mined and verified.

Preferably, step (1) comprises:

(1-1) Identifying the architecture, file system and compression mode of the given firmware of IoT device according to the compression characteristics of the firmware of IoT device, and reverse the firmware of IoT device according to the compression mode;

(1-2) Combined with the identified file system, classifying the reverse products of reverse processing into binary and non-binary files; Binary files are classified according to their schema and type; And non-binary files are converted to string text files;

(1-3) Disassembling Binary files according to their schema (ARM, X86 or MIPS) and converted into assembly code of the corresponding schemas;

(1-4) Taking the function as the unit to divide the assembly code into a more fine-grained structural unit, and the function unit obtained by the partition is arranged in a logical order to complete the mining of the semantic information of the firmware assembly code of IoT device.

Preferably, step (2) comprises:

(2-1) Based on the public CVE information database, a mapping relationship is built between the third-party components and their versions to the CVE information, and then to the functions and files where the vulnerability is located, and a database containing the third-party components and their known CVE is established;

(2-2) The string text file obtained in the step (1-2) is automated scanned, the first coarse-grained matching is carried out by the greedy matching principle based on the features of the third-party component's name, and the third-party component used in the firmware of IoT device are recorded;

Strings containing third-party components and their version numbers are extracted and classified by combination pattern. For all strings in the same combination mode, their rules are summarized to obtain regular expressions and added to the rule list;

(2-3) Based on the rule list, strings text file obtained in step (1-2) are automatic scanned. The third-party component name and its version number are used for the second fine-grained matching based on the greedy matching principle, and the third-party component and its version number used in the firmware of IoT device are recorded;

Combined with the database established in step (2-1), the vulnerabilities of third-party components in the firmware of IoT device are retrieved, and the security risks caused by the third-party components in the firmware of IoT device are detected and the report is output.

Further preferably, the scan matching in step (2-2) is based on cross-row matching rules.

If the scan matching of step (2-2) takes row as the unit, if the third-party component and its version number are distributed across rows during this process, the third-party component's name and version number cannot be included at the same time, resulting in omissions. Cross-row matching rules, on the other hand, are statistically based collection strategies that collect multiple lines of strings to include both third-party component's name and version number to avoid omissions.

Further, take a subset of the complete firmware dataset of IoT device as the test object, compare the number of rules and the scanning time ratio obtained under different numbers of rows, and select the best number of rows as the number of cross-line matches for the final cross-line matching rule.

Preferably, steps (3) comprising:

The strategy based on the string pattern matching retrieves the features of the third-party component in the firmware of IoT device, and the third-party components and the CVE information database module are combined to detect and report the third-party components in the firmware of IoT device, and the vulnerabilities related to the third-party components are obtained;

Based on BLSTM neural network model, the semantic information of the firmware of IoT device and the vulnerability function is calculated and compared, and the third-party components and the CVE information database module are combined to realize the detection and risk reporting of the third-party components in the firmware of IoT device.

Further, step (3) comprises:

(3-1) Combined with the database established in step (2-1), compiling the source code of the corresponding version of the third-party component in the compilation chain environment of different architectures (X86, ARM and MIPS), and extracting the binary file where the vulnerability is located from the binary file in the source code; disassemble according to the schema of the binary file where the vulnerability is located, and converting it into the assembly code of the corresponding schema;

(3-2) Taking the function as the unit to divide the assembly code where the vulnerability is located into a more fine-grained structural unit, and extracting the function unit where the vulnerability is located;

(3-3) Locating the assembly code where the obtained vulnerability is used as the training data for deep learning similarity comparison; marking assembly code derived from the same source code and compiled by different compilation chain environments as similar, and marking assembly code compiled from different source codes as dissimilar; regarding the operators and operands in the assembly code as words in natural language, assembly instructions are treated as sentences in natural language, and regarding semantic comparison of cross-architecture instructions as natural language translation; obtaining the similarity calculation model after training the BLSTM neural network using the training data; the similarity calculation model taking two sets of assembly code sequences that allow cross-architecture as input, with a similarity result as the output;

(3-4) Taking the assembly code obtained by step (1-4) with function as unit and the assembly code obtained by step (3-2) with function as the unit as the input of the similarity calculation model, and they are compared one by one to obtain the similarity of the two;

(3-5) Selecting the assembly code with the similarity higher than the preset threshold, taking the function in the corresponding firmware of IoT device as the potential security risk and output the report.

The present invention further provides a cross-architecture automated detection system for third-party components and their security risks, comprising:

The firmware of IoT device reverse extraction module, the firmware of IoT device is identified and reversed, and the resulting reverse products are classified into binary and non-binary files; disassemble binary files to mine the semantic information in them, and convert non-binary files into string text files;

The third-party components and CVE information database module, including the mapping relationship from third-party components and their versions to CVE information, and then to the vulnerability function and the file, provides data support to the third-party component risk detection module based on matching and the third-party component risk detection module based on similarity comparison;

The third-party component risk detection module based on the matching, retrieves the features of the third-party component in the firmware of IoT device based on the string pattern matching strategy, and the third-party component and the CVE information database module are combined to realize the detection and risk reporting of the third-party component in the firmware of IoT device, and the vulnerabilities related to the third-party components are obtained;

The third-party component risk detection module based on the similarity comparison, based on the BLSTM neural network model, calculates and compares the semantic information of the firmware of IoT device and the vulnerability function, combined with the third-party components and the CVE information database module to achieve the detection and risk reporting of the third-party component in the firmware of IoT device.

Compared with the prior art, the present invention has the following beneficial effects:

(1) The cross-architecture automated detection technology of third-party components and their security risks in the firmware of the IoT device of the present invention is based on reverse analysis and deep learning to conduct firmware security analysis, the specific process is: reverse breaking the firmware of the IoT device, stringifying and disassembling the reverse file, detecting the third-party components and their security risks based on pattern matching with combination of the vulnerability database, detecting the third-party components and their security risks based on similarity comparison with the combination of the vulnerability database. It can be seen that in the whole process, there is no need to obtain firmware source code, and there is no dependence on the actual IoT device. The scanning and detection process is fully automated, that makes up for the shortcomings of source-based static analysis technology and device-based dynamic analysis technology, which can be directly applied to the closed-source firmware security analysis of IoT device, and can efficiently detect and mine the third-party components and their security risks.

(2) The method and system of the invention can extend the detection capability to other architectures only by modifying part of the units therein, and can achieve cross-architecture firmware vulnerability mining. If the method is applied to the firmware of an IoT device using a new architecture, the source code of the third-party component needs to be compiled in the compilation chain environment of the corresponding architecture, and the intermediate binary products need to be disassembled and added to the training set of the similarity comparison model training unit; The match-based third-party component risk detection module is even more unaffected by the architecture.

(3) The present invention improves the word vector model of natural language processing technology and applies it to code similarity detection, and innovatively apply it to the firmware security analysis, the similarity reaches a certain threshold that is considered to have a corresponding security risk in the firmware. At the same time, the risk detection modules based on the matching third-party components corroborate each other, and the accuracy rate is achieved after inspection.

SPECIFIC DESCRIPTION OF THE EMBODIMENTS

Figure 1:
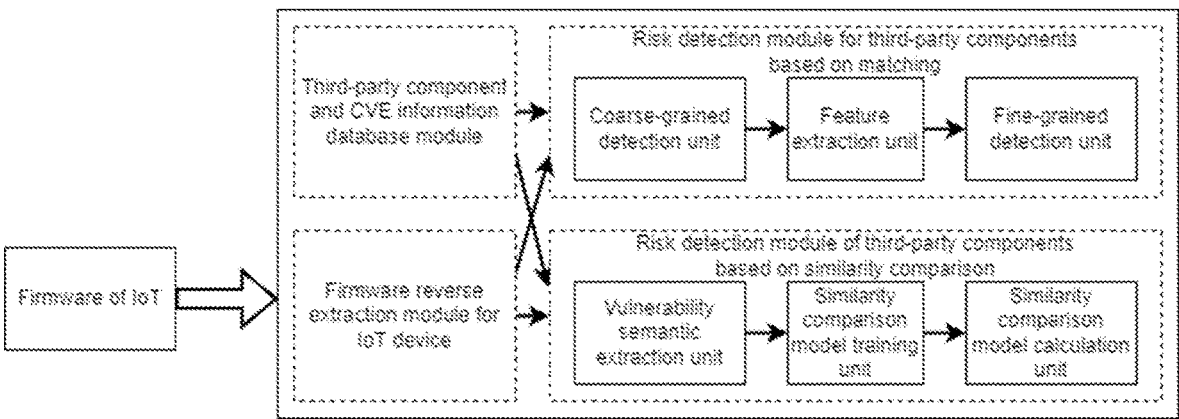
FIG. 1 is the overall module structure diagram of the cross-architecture automated detection system for third-party components and their security risks.

The present invention is further described in detail in combination with the attached drawings and the implementation, it should be noted that the following implementation is intended to facilitate understanding of the present invention, and does not have any qualifying effect on it.

The present invention provides a cross-architecture automated detection method for third-party components and their security risks in the firmware of IoT device, this method compares and analyzes the feature information of third-party components and the semantic information of code by compressing and decompiling firmware and combining with the self-built vulnerability information base, automatically collects and retrieves third-party components of firmware, collects, compares, and retrieves CVE (Common Vulnerabilities & Exposures) for corresponding third-party components. This includes the following steps:

Step 1: Identifying and reversing the firmware of IoT device, classifying and extracting the reverse product, and disassembling the binary executable files in them to mine the semantic information; comprising the following steps:

(1-1) Identifying the architecture, file system and compression mode of the given firmware of IoT device according to the compression features of the firmware of IoT device, and reversing the firmware according to the compression method;

(1-2) Classifying and extracting the backward files in combination with the identified file system, collecting the binary executable files in them and classifying them according to the schema and type of the binary files; converting non-binary files to string text files;

(1-3) For the binaries obtained in step (1-2), disassembling them according to the schema of the binary (ARM, X86 or MIPS) and converting them into assembly code of the corresponding schemas;

(1-4) Using the function as a unit to divide the assembly code into more fine-grained structural units, and arranging the function units obtained by the partitions in a logical order to complete the mining of the semantic information of the firmware of IoT device;

Step 2: Establishing a database containing third-party components and their known CVE (Common Vulnerabilities & Exposures), automatically scanning and collecting third-party components in the firmware of IoT device combined with pattern matching, collecting and retrieving the CVE of corresponding third-party components; comprising the following steps:

(2-1) Based on the public CVE information base, building a mapping relationship from the third-party components and their versions to the CVE information, and then to the function and the file where the vulnerability is located;

(2-2) Scanning string files obtained in step (1-2) automatically, the first coarse-grained matching is performed based on the greedy matching principle with featuring third-party components name and the third-party components used in the firmware are recorded; Extracting the string containing the third-party component and version number, and classify it according to the combination mode, the rules of all the strings with the same mode are summarized to obtain a regular expression, and added to the rule list;

(2-3) Based on the more complete list of matching rules in step (2-2), scanning the string files obtained in step (1-2) automatically, and using the greedy matching principle to perform the second fine-grained matching with featuring the third-party component's name and version number, and recording the third-party components used in the firmware and their version numbers; Combined with the CVE database established in step (2-1), retrieving the CVE of the third-party components in the firmware, and detecting the security risks caused by the third-party components in the firmware of IoT device and outputting the report;

(2-4) Designing a collection strategy based on statistics to avoid missing cross-row matching rules, wherein the scan matching mothed in step (2-2) is proceed in row units, if a third-party component and its version number are distributed across rows during the process, collection of multiple lines of strings is required to include both the component's name and the version number. Taking a subset of the complete firmware dataset as the test object, comparing the number of rules and the scanning time ratio obtained under different row numbers, and selecting the best number of rows as the final collection strategy.

Step 3: By organically combining the semantic information of the vulnerability assembly code and the semantic information encoded by the firmware assembly code, realizing the similarity comparison across architectures and based on deep learning, and mining and verifying the specific pattern vulnerabilities automatically. The step comprises the following steps:

(3-1) Combined with the CVE database established in step (2-1), compiling the source code of the corresponding version of the third-party component in the compilation chain environment of different architectures (X86, ARM and MIPS), and extracting the binary file where the vulnerability is located from the binary executable file as an intermediate product. It is disassembled according to the schema of the binary file and converted into the assembly code of the corresponding schema;

(3-2) Taking the function as the unit to divide the assembly code into more fine-grained structural units, and extracting the function where the vulnerability is located;

(3-3) Using the obtained assembly code as the training data for deep learning similarity comparison; marking assembly code derived from the same source code and compiled by different compilation chains as similar, and marking assembly code compiled from different source code as not similar; treating operators and operands in assembly code as words in natural language, operating assembly instructions as sentences in natural language, and treating semantic comparison across architectural instructions as natural language translation; obtaining a similarity calculation model through training the BLSTM neural network by the training data of the assembly code. The model takes two sets of assembly code sequences that allow cross-architecture as inputs, with a similarity result as output;

(3-4) On the basis of the assembly code with the function as the unit of the firmware of IoT device obtained in step (1-3) and the assembly code of the function where vulnerability is located in step (3-2), the assembly code of the function where the vulnerability is located and the assembly code of the function of the firmware are compared one by one, that is, they are taken as input to the similarity calculation model obtained in step (3-3) to obtain the similarity;

(3-5) Selecting several firmware functions with the highest similarity as potential security risks and output the report.

The present invention implements the above steps by four modules, as shown in FIG. 1, comprising a firmware reverse extraction module of IoT device, a third-party component and a CVE information database module, a third-party component risk detection module based on matching, and a third-party component risk detection module based on similarity comparison.

(1) The role of the reverse extraction module of the firmware of IoT device is to identify the architecture, file system and compression method of the firmware of a given IoT device according to the compression features of the firmware of IoT device, and reverse the firmware according to the compression method.

Combined with the identified file system, the reverse files are classified and extracted, and the binary executable files are collected and classified according to the schema and type of the binary files; The non-binary files are converted to string text files.

The binary files obtained above are disassembled according to the schema (ARM, X86 or MIPS) of the binary and converted into assembly code of the corresponding schemas. The function is used as a unit to divide the assembly code into a more fine-grained structural unit, and the function units obtained by the partition are arranged in a logical order to complete the mining of the semantic information of the firmware of IoT device.

(2) The role of the third-party components and CVE information database module is to build the mapping relationship from the third-party components and their versions to the CVE information, and then to the functions and files where the vulnerability is located, based on the public CVE information database. The function of this module is to provide data support to the match-based third-party component risk detection module and the third-party component risk detection module based on similarity comparison.

Figure 2:
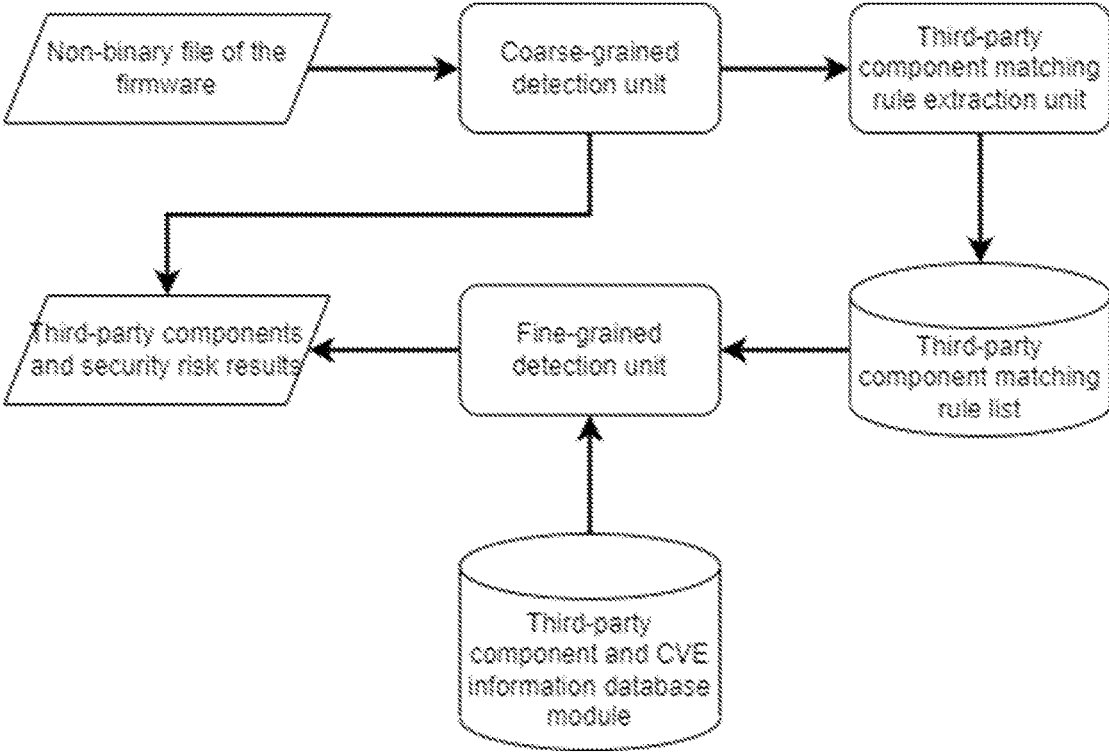
FIG. 2 is a workflow diagram of the risk detection module based on a matching third-party component.

(3) The role of the third-party component risk detection module based on matching is to retrieve the features of third-party components in the firmware of IoT device based on the string pattern matching strategy, and combine the third-party components and the CVE information database module to effectively detect and report the third-party components in the firmware of IoT device. The workflow of this module is shown in FIG. 2.

The coarse-grained detection unit scans the string files obtained by module 1 automatically, the first coarse-grained matching is performed based on the greedy matching principle with featuring the third-party component name and the third-party component used in the firmware is recorded. The rule extraction unit extracts the strings containing the third-party components and version numbers, and classifies them according to the combination pattern, summarizes all the strings with the same mode and obtains the regular expression, which is added to the rule list.

Based on the more complete list of matching rules described above, the fine-grained detection unit scans the string files obtained by module 1 automatically, uses the greedy matching principle to perform the second fine-grained matching with featuring the third-party component's name and version number, and records the third-party component used in the firmware and its version number; Combined with the CVE database established in step 2, the CVE of the third-party component in the firmware is retrieved.

Figure 3:
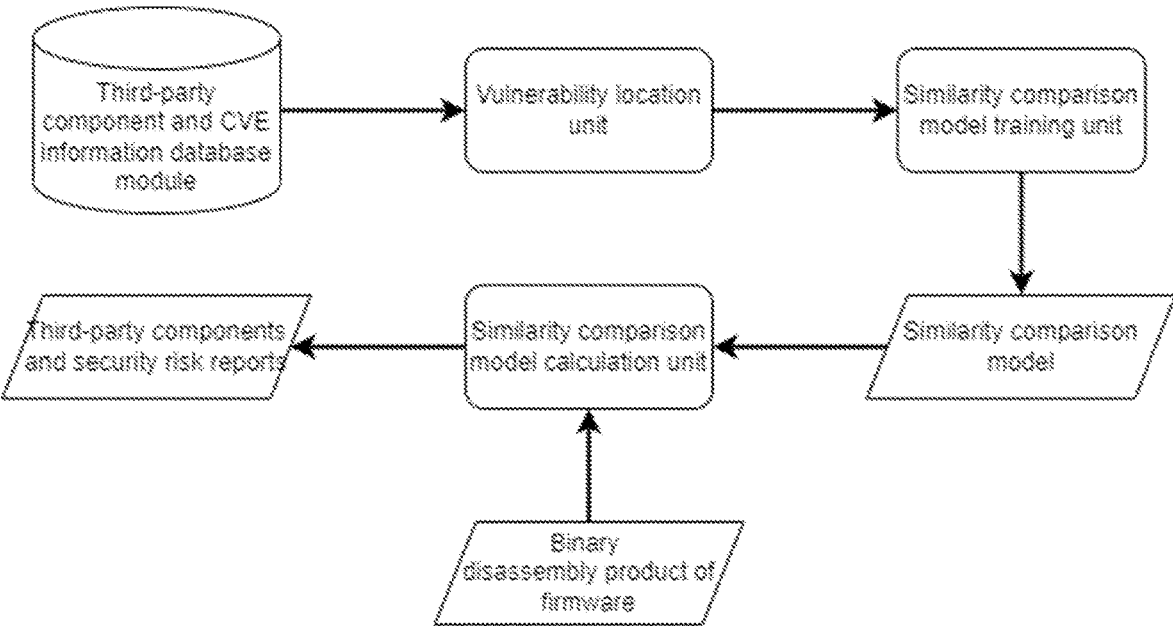
FIG. 3 shows a workflow diagram of the risk detection module for third-party components based on similarity comparison.

(4) The role of the third-party component risk detection module based on similarity comparison is based on BLSTM neural network model in natural language processing, which is used to calculate and compare the semantic information of the firmware of IoT device and the vulnerability function, and combines the third-party components and the CVE information database module to achieve effective detection and risk reporting of the third-party components in the firmware of IoT device. The workflow of the module is shown in FIG. 3.

Vulnerability locators compile the source code of the corresponding versions of third-party components in the compilation chain environments of different architectures (X86, ARM and MIPS) and extract the binary files in which the vulnerability resides from the binary executables that are intermediates; Disassembles the binary file according to the schema and converts it to the assembly code of the corresponding schema. The functions are taken as units to divide the assembly code into more fine-grained structural units, and the function where the vulnerability is located is extracted.

The training unit of similarity comparison model uses the resulting assembly code as the training data for deep learning similarity comparison. Assembly codes derived from the same source code and compiled by different compilation chains are marked as similar, and assembly codes compiled from different source codes are marked as not similar. Operators and operands in assembly code are treated as words in natural language, assembly instructions are treated as sentences in natural language, and semantic comparisons across architecture instructions are treated as natural language translations. The above-mentioned assembly code training data is trained by the BLSTM neural network to obtain a similarity calculation model. The model takes two sets of assembly code sequences that allow cross-architecture as input, with a similarity result as output;

The calculation unit of the similarity comparison model compares the assembly code of the vulnerability function with the assembly code of each function of the firmware one by one on the basis of obtaining the functional assembly code of the firmware of the IoT device in step 1 and obtaining the functional assembly code of the vulnerability location unit, that is, the two are input into the similarity calculation model obtained by the training unit of the similarity comparison model to obtain the similarity. Finally, several of the most similar firmware functions are selected as potential security risks and a report is output.

Implementation

To further demonstrate the effect of the implementation of the present invention, the implementation is experimented with firmware from many different manufacturers, different devices and different architectures. We downloaded the firmware of IoT device from the official web sites of multiple manufacturers, recorded the manufacturer, device, version and architecture of these firmwares. In addition, we pre-imported relevant data to third-party components and the CVE information database module based on the CVE official website and the third-party component official website. We applied the present invention to several downloaded firmware, to achieve the detection of third-party components of the firmware of IoT device and their security risks, and the corresponding results were verified manually.

The firmware information and experimental data are shown in Table 1. The firmware covers four vendors, two different IoT devices, and two different architectures, demonstrating that the invention can be adapted to different vendors, devices, and different architectures. Experimental result showed that the present invention reported a total of 108 security risks associated with third party components in five firmware, after manual verification, 102 effective security risks associated with third-party components are identified. Compared with manual reverse analysis, manual reverse analysis takes a lot of time, and the time spent depends on the analyst's coding analysis experience and proficiency. The mining process of the invention and the experience of the analyst have nothing to do with it, take less time and are more efficient. Compared with dynamic analysis, dynamic analysis requires additional funds to purchase the corresponding equipment and cannot be applied to large-scale firmware scenarios.

Thus, according to the experiments, the present invention can detect security risks associated with third-party components in the firmware of the IoT device efficiently and automatically.

TABLE 1

Firmware information and experimental data

| Firmware manufacturer | Device | Architecture | Number of security risks reported | Effective number of security risks |
|---|---|---|---|---|
| Trendnet | router | ARM | 21 | 21 |
| Trendnet | router | MIPS | 19 | 19 |
| TP-Link | router | MIPS | 24 | 24 |
| Tuya | Camera | ARM | 20 | 14 |
| XM | Camera | ARM | 24 | 24 |

The above implementation provides a detailed description of the technical scheme and beneficial effects of the invention, it should be understood that the above is only a specific implementation of the invention, and it is not intended to limit the present invention, where any modifications, additions and equivalent substitutions etc. made within the scope of the principles of the present invention, should be included within the scope of the invention.

The invention claimed is:

1. A cross-architecture automated detection method for third-party components and security risks thereof, comprising the following steps:

a first step: identifying and reversing firmware of the Internet of Things (IoT) device, and classifying generated reverse products into binary and non-binary files; disassembling the binary file to mine semantic information in the binary file; converting a non-binary file into a string text file;

a second step: establishing a database containing third-party components and their known Common Vulnerabilities and Exposures (CVE); automatically scanning the string text files, collecting third-party components in the firmware of IoT device combined with pattern matching, and collecting and retrieving vulnerabilities of corresponding third-party components;

a third step: realizing cross-architecture and deep learning-based similarity comparison, and automatically mining and verifying specific pattern vulnerabilities by combining the semantic information of the assembly code of vulnerability and the semantic information of the assembly code of the firmware of IoT device;

wherein the first step further comprises:

a first sub-step of the first step: identifying an architecture, a file system and a compression method of the given firmware of IoT device according to compression characteristics of the firmware of IoT device, and reversing the firmware of IoT device according to the compression method;

a second sub-step of the first step: combined with an identified file system, classifying the reverse products produced by reverse processing into binary and non-binary files; the binary files are being classified according to their schema and type; the non-binary files are being converted to string text files;

a third sub-step of the first step: the binary files are being disassembled according to their schemas and converted into the assembly code of corresponding schemas;

a fourth sub-step of the first step: using a function as a unit to divide the assembly code into a more fine-grained structural unit, and arranging function units obtained by a partition in a logical order to complete the mining of the semantic information of the firmware of IoT device assembly code;

wherein the second step comprises:

a first sub-step of the second step: based on the public CVE information database, building a mapping relationship between the third-party components and their versions to the CVE information and then to functions and files where the vulnerability is located, and establishing a database containing the third-party components and their known CVE;

a second sub-step of the second step: scanning the string text files obtained in the second sub-step of the first step automatically and matching for the first time with the greedy matching principle based on the name features of third-party components, and recording the third-party components used in the firmware of IoT device;

extracting and classifying the strings containing third-party components and their version numbers by combination pattern; for all strings in the same combination mode, summarizing their rules to obtain regular expressions and adding them to the rule list;

a third sub-step of the second step: based on the rule list, automatically scanning the string text files obtained in the second sub-step of the first step, and using the third-party component's name and its version number for the second fine-grained matching based on the greedy matching principle, and recording the third-party component used in the firmware of IoT device and its version number;

combined with the database established in the first sub-step of the second step, retrieving the vulnerabilities of third-party components in the firmware of IoT device, and detecting the security risks caused by the third-party components in the firmware of IoT device and outputting the report.

2. The cross-architecture automated detection method for third-party components and their security risks according to claim 1 is characterized by the following, wherein the scanning match in the second sub-step of the second step is cross-line matching rule.

3. The cross-architecture automated detection method for third-party components and their security risks according to claim 2, which is characterized by taking a subset of the complete firmware dataset of IoT device as a test object, comparing a number of rules and a scanning time ratio obtained under different numbers of lines, and selecting an optimal number of rows as a number of cross-line for final cross-line matching rules.

4. The cross-architecture automated detection method for third-party components and their security risks according to claim 1 is characterized by the following, wherein the third step comprises:

based on the string pattern matching strategy, retrieving the third-party components characteristics in the firmware of IoT device, and combining the third-party components and a CVE information database module to detect and report the risk of the third-party components in the firmware of IoT device, and obtaining the vulnerabilities related to the third-party components;

based on the Bi-directional Long Short-Term Memory (BLSTM) neural network model, calculating and comparing the semantic information of the firmware of IoT device and the vulnerability function, and combining the third-party components and the CVE information database module to realize detection and risk reporting of the third-party components in the firmware of IoT device.

5. The cross-architecture automated detection method for third-party components and their security risks according to claim 4 is characterized by the following, wherein the third step further comprises:

a first sub-step of the third step: combined with the database established in the first sub-step of the second step, compiling the source code of the corresponding version of the third-party component in the compilation chain environment of different architectures, and extracting the binary file where the vulnerability is located from the binary file in the source code; processing disassembly according to the framework of the binary file where the vulnerability is located, and converting the binary code into the assembly code of the corresponding schema;

a second sub-step of the third step: taking a function as a unit to divide into a more fine-grained structural unit, and extracting the function unit where the vulnerability is located;

a third sub-step of the third step: using the obtained assembly code is used as training data for deep learning similarity comparison; marking assembly code derived from the same source code and compiled by different compilation chain environments as similar, and marking assembly code compiled from different source codes as dissimilar; regarding the operators and operands in the assembly code as words in natural language, treating assembly instructions as sentences in natural language, and regarding semantic comparisons of cross-architecture instructions as natural language translations; obtaining the similarity calculation model after training the BLSTM neural network model using the training data; the similarity calculation model taking two sets of assembly code sequences that allow cross-architecture as inputs, with a similarity result as the output;

a fourth sub-step of the third step: using the assembly code obtained by the fourth sub-step of the first step with the function as the unit and the assembly code obtained by the second sub-step of the third step with the function as the unit as the input of the similarity calculation model, and comparing the assembly code obtained by the fourth sub-step of the first step and the assembly code obtained by the second sub-step of the second step one by one to obtain the similarity of the two;

a fifth sub-step of the third step: selecting the assembly code with the similarity higher than the preset threshold, taking the function in the corresponding firmware of IoT device as the potential security risk and output the report.

6. A cross-architecture automated detection system for third-party components and their security risks, comprising:

an IoT device comprising a non-transitory memory;

a reverse extraction module of a firmware of the IoT device, identifying and reversing a firmware of the IoT device, and classifying reverse products into binary and non-binary files; and disassembling binary files to mine semantic information, and converting non-binary files into string text files;

third-party components and Common Vulnerabilities & Exposures (CVE) information database modules, including mapping relationship from third-party components and their versions to the CVE information, and then to a vulnerability function and a file, provide data support to a third-party component risk detection module based on matching and the third-party component risk detection module based on similarity comparison;

the third-party component risk detection module based on matching, retrieves third-party component characteristics in the firmware of the IoT device based on a string pattern matching strategy, and the third-party components and the CVE information database module are combined to realize detection and risk reporting of the third-party components in the firmware of the IoT device, and the vulnerabilities related to the third-party components are obtained;

the third-party component risk detection module based on the similarity comparison, based on BLSTM neural network model, calculates and compares semantic information of the firmware of the IoT device and the vulnerability function, combined with the third-party components and the CVE information database module to achieve the detection and risk reporting of the third-party components in the firmware of the IoT device.

* * * * *